United States Patent [19]

Wike, Jr.

[11] Patent Number: 5,081,364
[45] Date of Patent: Jan. 14, 1992

[54] MULTIFOCAL SCANNING SYSTEM

[75] Inventor: Charles K. Wike, Jr., Ithaca, N.Y.

[73] Assignee: NCR Corporation, Dayton, Ohio

[21] Appl. No.: 618,130

[22] Filed: Nov. 26, 1990

[51] Int. Cl.⁵ .............................................. G06K 5/00
[52] U.S. Cl. ..................................... 250/555; 235/467
[58] Field of Search ....................... 250/555, 566, 568; 235/462, 467, 468, 470, 472

[56] References Cited

U.S. PATENT DOCUMENTS

| | | | |
|---|---|---|---|
| 3,784,794 | 1/1974 | Allais | 235/472 |
| 4,034,230 | 7/1977 | Brill et al. | 250/568 |
| 4,143,809 | 3/1979 | Uebbing et al. | 235/462 |
| 4,560,862 | 12/1985 | Eastman et al. | 235/467 |
| 4,652,750 | 3/1987 | Eastman et al. | 235/472 |
| 4,713,532 | 12/1987 | Knowles | 235/467 |
| 4,736,095 | 4/1988 | Shepard et al. | 235/472 |
| 4,758,715 | 7/1988 | Stamm | 235/462 |
| 4,766,298 | 8/1988 | Meyers | 235/467 |
| 4,820,911 | 4/1989 | Arackellian et al. | 250/566 |
| 4,971,410 | 11/1990 | Wike, Jr. et al. | 250/566 |
| 5,000,529 | 3/1991 | Katoh et al. | 235/467 |

Primary Examiner—David C. Nelms
Assistant Examiner—S. Allen
Attorney, Agent, or Firm—Richard W. Lavin

[57] ABSTRACT

A bar code scanning system having a focusing lens for focusing scanning light beams in a first focal plane includes a slide member supporting a transparent substrate which enables the focusing lens to focus the light beams in a first focal plane through which a coded indicia is moved. When a coded indicia is moved closer to the focusing lens, the intensity of the reflected light beams increases which is detected by a detector member whose output signals operate a drive member coupled to the slide member, moving the slide member to a position removing the substrate from the path of light beams enabling the focusing lens to focus the light beams in a second focal plane which is closer to the focusing lens than the first focal plane.

15 Claims, 5 Drawing Sheets $D = (N-1)t/N$

MULTIFOCAL SCANNING SYSTEM

BACKGROUND OF THE INVENTION

The present invention relates to optical scanning systems and more particularly to an optical bar code scanning system in which the bar code can be positioned at various distances from the scanner during a scanning operation.

In present-day merchandising point-of-sale operations, data pertaining to the purchase of a merchandise item is obtained by reading data encoded indicia such as a bar code printed on the merchandise item. In order to standardize the bar codes used in the various point-of-sale checkout systems, the grocery industry has adopted a uniform product code (UPC) which is in a form of a bar code. Various reading systems have been constructed to read the bar code, including hand-held wands which are moved across the bar code, stationary optical reading systems normally located within a check-up counter in which the bar code is read when a purchased merchandise item is moved across a window comprising the scanning area of the counter and portable stand-alone desk-top laser scanning work stations which include a laser scanning head mounted above a support base and facing the operator in which objects bearing bar code symbols which are to be scanned are passed underneath the head. In each of these prior scanning systems, the projected scanning light beams are all focused in a singe plane which is located in the plane of movement of the object bearing the coded label or in the case of hand-held scanning systems in a plane in which the bar code label is positioned. Since many merchandise items support the coded label at various angles to the focal plane of the scanning unit, complex and expensive optical systems have been developed to transmit the scanning light beams at different angles to cover all possible orientations of the bar code label to ensure a valid scan operation. This requirement limits the operating efficiency of the scanning systems, while increasing their cost. In the case of overhead bar code scanning systems, the positioning of the bar code label with respect to the scanning head is very critical to the reading of the bar code label. It has been found that the operator has trouble locating the bar code label in the focal plane of the scanning system which requires the scanning operation to be repeated thereby increasing the time of processing the merchandise item.

SUMMARY OF THE INVENTION

A scanning system comprises a base member supporting a vertically orientated support member having an overhanging scanning head portion in which is mounted the optics for generating a multi-line scan pattern for scanning a bar code label positioned adjacent the other side of the scanning head portion. Mounted in a neck portion of the scanning head portion is a laser source for projecting a laser beam along the axis of the neck portion towards a routing mirror located in the head portion which directs the laser beam at a rotating spinner member orientated at an angle to the floor of the head portion. The spinner member, which in the present embodiment is composed of a six-sided polygon, directs the received light beam in an opposite and upward direction at a plurality of pattern mirrors which are orientated to reflect the received light beams from the spinner member in a downward direction through an aperture located in the floor of the neck portion. Mounted between the laser source and the routing mirror is a slide member having a pair of apertures extending therethrough in which one aperture includes a glass member mounted therein. The slide member is slidably mounted within a pair of rail members and includes a resilient member mounted at one end of the slide member for normally urging the slide member to a home position. The slide member further includes an arm member which extends outwardly from the side of the slide member and is engaged by the armature of a solenoid secured to the floor of the neck portion. The solenoid is coupled to a microprocessor which is also coupled to a multilevel detector located in the head portion of the scanning device and which receives the reflected light beams from the scanned bar code label from a collection mirror mounted in the scanning head portion. The detector includes a first detector portion which will output a signal whose intensity is at a first level when the bar code label is positioned adjacent the scanning head portion. As the bar code label is moved away from the scanning head, a second detector portion of the detector will output a signal enabling the microprocessor to energize the solenoid. Operation of the solenoid will move the slide member to a position where the aperture containing the glass member is positioned in the beam axis of the laser source for adjusting the focal length of the scanning beam to a position which is farther than the normal focal length of the system. When the bar code label is moved closer to the scanning head, the signal outputted by the first detector portion will enable the microprocessor to disable the operation of the solenoid enabling the resilient member to move the slide to its home position in which the aperture without the glass member is positioned in the beam axis of the laser source whereby the focal plane of the scanning light beams is moved closer to the scanning head.

It is therefore a principal object of this invention to provide an optical bar code scanning device which is constructed to vary the focal point of the scanning light beams in accordance with the distance that the scanned object is positioned with respect to the scanning device.

It is another object for this invention to provide a bar code scanner which focuses the scanning light beams at a number of different focal points.

It is a further object that this invention provide an overhead bar code scanner for focusing the scanning light beams at a plurality of focal points which is simple in construction and low in cost.

BRIEF DESCRIPTION OF THE DRAWINGS

These and other objects, features and advantages of the invention, as well as the invention itself, will become more apparent to those skilled in the art and in light of the following detailed description taken in consideration with the accompanied drawings wherein like reference numerals indicate like or corresponding parts throughout the several views and wherein.

DESCRIPTION OF THE PREFERRED EMBODIMENT

Figure 1:
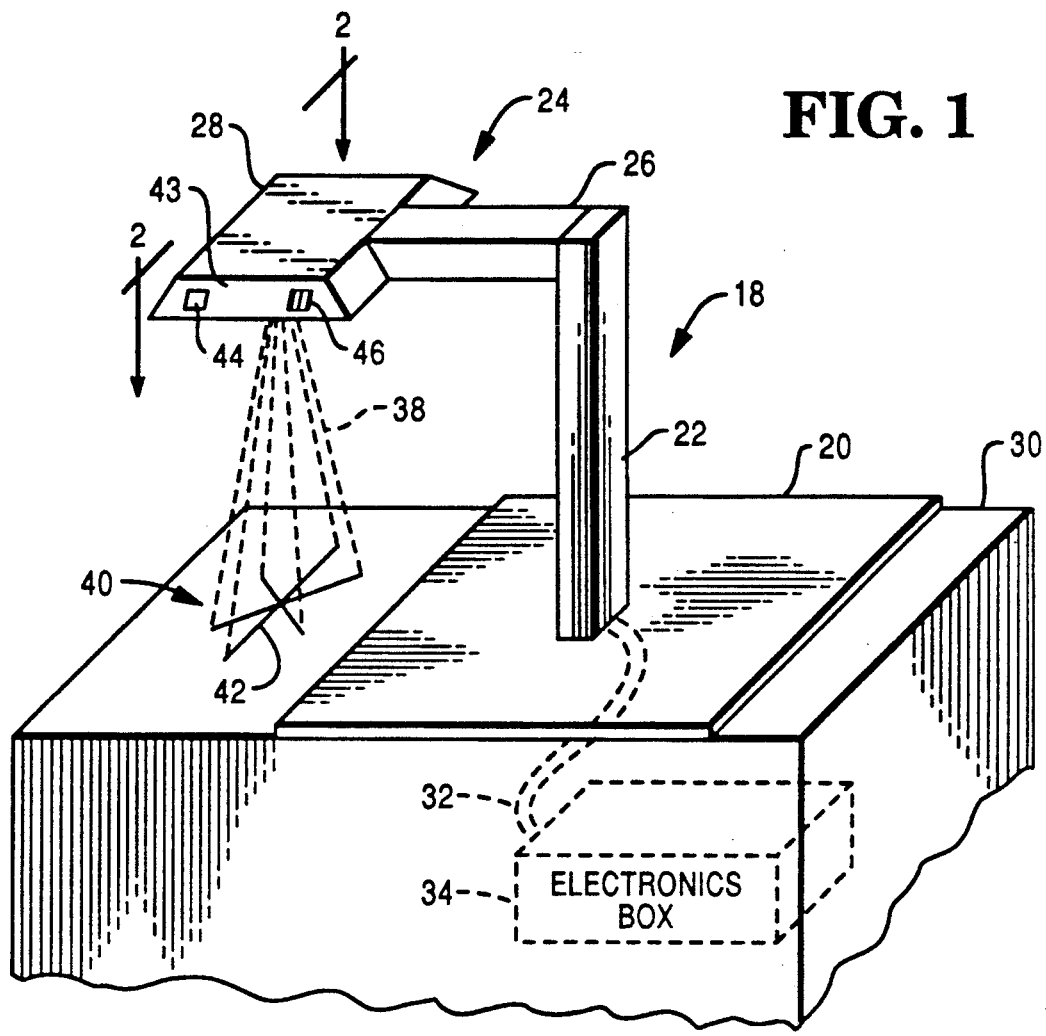
FIG. 1 is a perspective view of the portable overhead bar code scanning device of the present invention positioned on a checkout counter showing the multi-line scanning pattern generated by the scanning device together with the electronics box located within the counter which is used to control the operation of the scanning device.

Referring now to FIG. 1, there is shown a perspective view of the bar code scanning device which includes the present invention. The scanning devices generally indicated by the numeral 18 which includes a portable base member 20 supporting a post member 22 from which extends a scanning head member generally indicated by the numeral 24. The head member 24 includes a neck portion 26 and a scanning head portion 28 within which is located the scanning optics for the scanning device. The bar code scanning device 18 may be positioned on any supporting surface such as the top surface of a checkout counter 30 and has an electrical cable member 32 extending from the bottom of the post member 22 to an electronics box member 34 containing the electronics associated with the scanning device for use in processing information generated by the scanning device. As shown in FIG. 1, projecting from the lower side of the scanning head portion 28 are a plurality of scanning light beams 38 which form a bar X scanning pattern represented by the numeral 40 which includes six intersecting scan lines 42 forming the pattern 40. Located in a side wall 43 of the head portion 28 and normally facing the checkout operator is an indicator light fixture 44 which may include two light members 45 (FIG. 4) (red) and 47 (green) indicating whether the scanning device has successfully read (green) the bar code label or not (red). In addition to the indicator light 44, a loudspeaker 46 mounted in the side wall 43 will generate a tone indicating whether a good read has occurred. The electronics box member 34 may be mounted within the checkout counter 30 or positioned adjacent the base member 20 on top of the counter 30.

Figure 3:
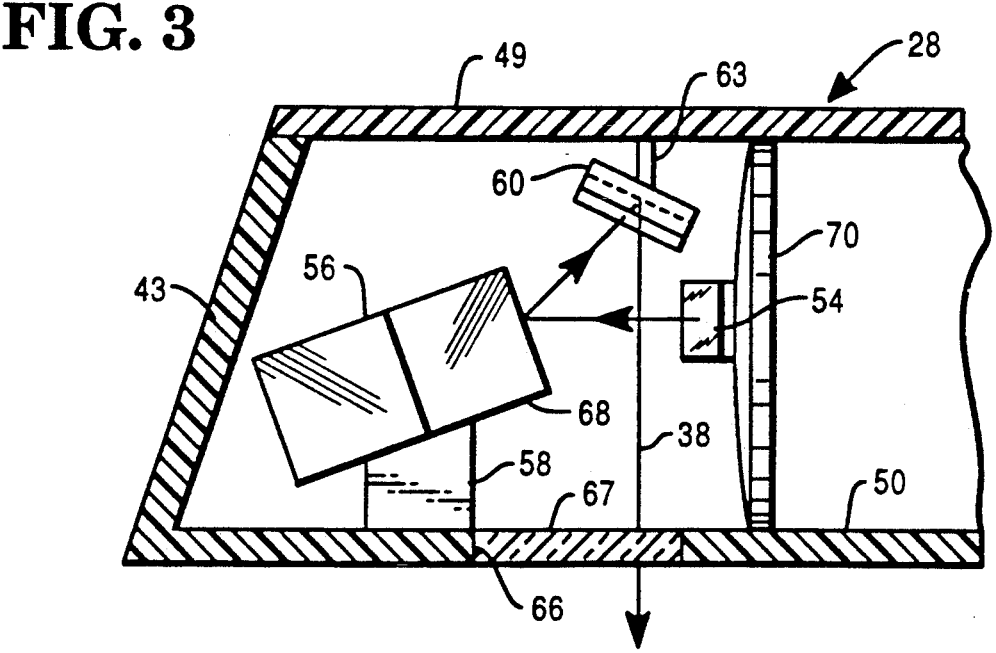
FIG. 3 is an enlarged side sectional view taken on line 3—3 of FIG. 2 showing the direction of the scanning light beams as they are reflected off the spinner member and the pattern mirrors.
Figure 2:
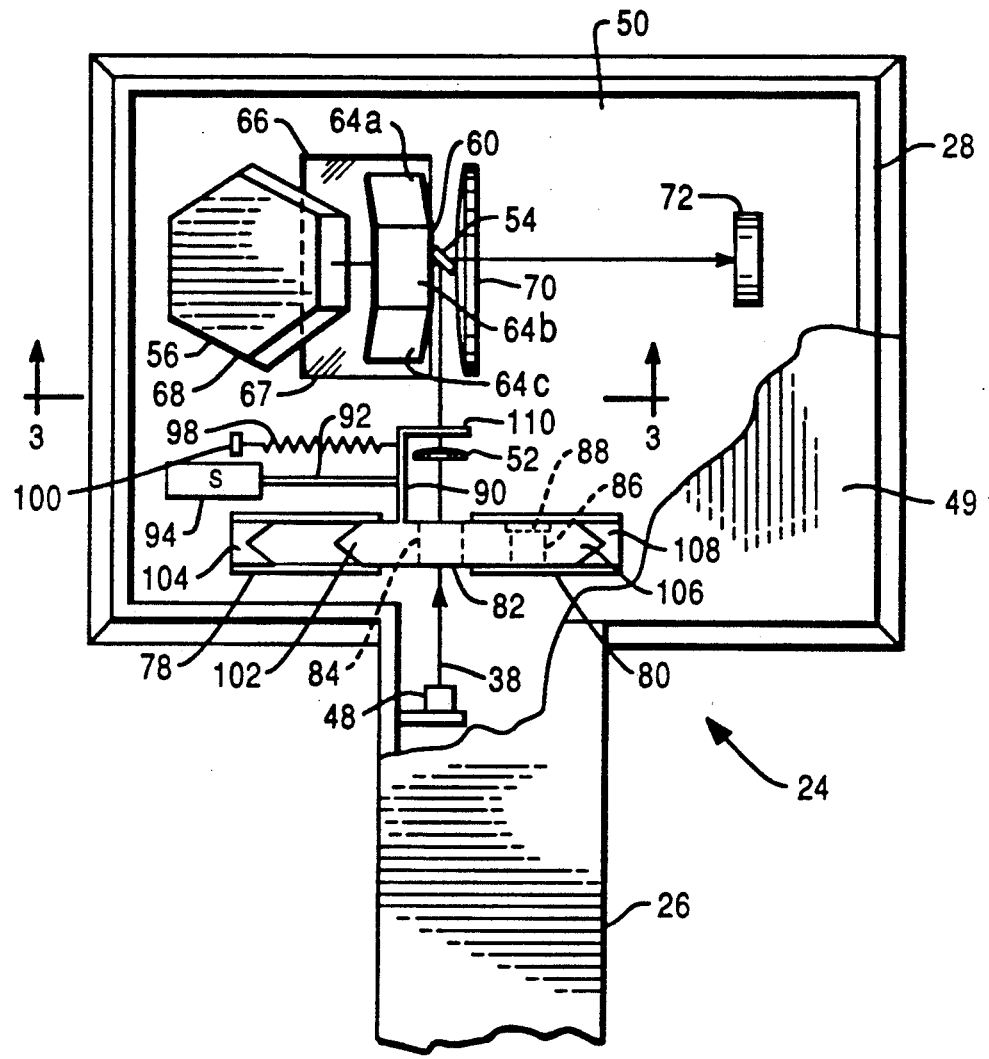
FIG. 2 is a partial top view of the scanning device taken on lines 2—2 of FIG. 1 showing a portion of the laser diode located in the neck portion of the scanning device together with the optics located in the head portion of the scanning device for generating a scanning pattern in a downward direction to an aperture in the floor of the head portion and the slide member which varies the location of the focal plane of the scanning light beams.

Referring now to FIG. 2, there is shown a partial top view of the head portion 28 with a portion of the cover member 49 of the head portion removed showing a laser diode member 48 mounted in the neck portion 26 of the scanning head member 24. Mounted within the head portion 28 in line with the laser member 48 is a collimator lens member 52 which receives the diverging laser light beam 38 from the diode member 48 and focuses the light beam at a specific distance below the floor member 50 of the head portion 28. The collimated light beam outputted by the lens member 52, which would appear as a point in FIG. 3, is directed at a routing mirror 54 which reflects the received light beam along a horizontal axis to a six-sided polygon spinner member 56 rotatably secured to a motor member 58 (FIG. 3) mounted on the floor member 50 of the head portion 28.

As shown in FIG. 2, the routing mirror 54 deflects the light beam 38 ninety degrees from its original light path toward the spinner member 56 which is tilted at an acute angle such as twenty degrees with respect to the axis of the path of the received light beam. The rotating spinner member 56 will deflect the received light beam to a pattern mirror assembly 60 (FIG. 3) which is secured to the cover member 49 of the head portion 28 by the support member 63. The mirror assembly 60 comprises three pattern mirrors 64a-64c inclusive (FIG. 2), which are mounted above and between the spinner member 56 and the routing mirror 54. The mirrors in the pattern mirror assembly 60 are offset with respect to each other and to the floor member 50 to generate the individual scan lines 42 (FIG. 1) which comprise the scanning pattern 40 (FIG. 1) in a manner that is well known in the art.

The mirror assembly 60 is also mounted at an angle such as twenty-five degrees with respect to the path of the received light beams to deflect the received scanning light beams in a downward direction as viewed in FIG. 3 through an aperture 66 (FIGS. 2 and 3) in the floor member 50 containing a window member 67 to form the scanning pattern 40 (FIG. 1) at a predetermined distance below the floor member 50 of the head portion 28. The path of the light beams deflected from the pattern mirror assembly 60 is generally perpendicular to the path of travel of the light beam deflected from the routing mirror 54. The scanning optical system of the present invention generates the scanning pattern 40 (50 FIG. 1) which increases the reading capability of the scanning device because the size of the scanning pattern 40 changes as the bar code label (not shown) is positioned by the checkout operator at different distances from the head portion 28 enabling the scanning device to read large size bar code labels and small size bar code labels.

Figure 11:
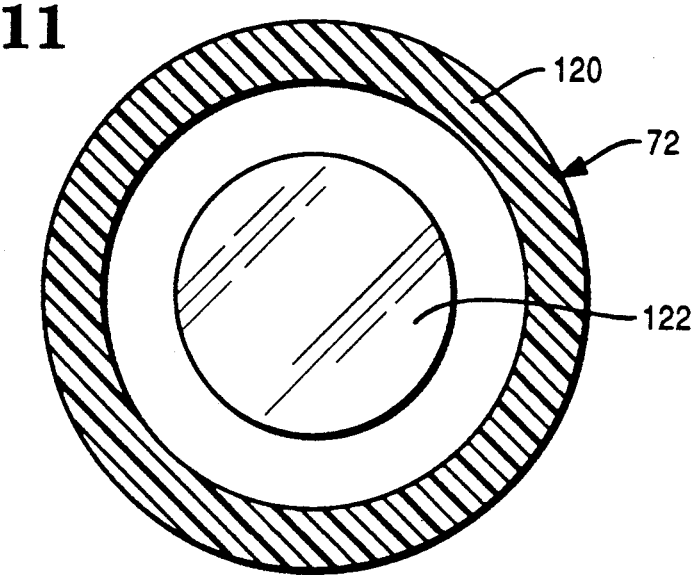
FIG. 11 is an enlarged front view of the multilevel detector showing the location of the inner and outer detector portions of the detector.

The light reflected from the scanned bar code label (not shown) is re-directed back to the pattern mirror assembly 60 which deflects the light beams to the spinner member 56 which in turn deflects the received light beams to the routing mirror 54. The light reflected from the scanned bar code label is in a scattered condition which is collected by a collection lens 70 mounted between the cover member 49 and the floor member 50 of the head portion 28. The collection lens 70, which supports the routing mirror 54, will focus the received scattered light beams at a multi-level detector 72 (FIGS. 2 and 11) which is mounted adjacent the floor member 50 of the head portion 28. As is well known in the art, the detector member 72 to which the cable 32 (FIG. 1) is connected will generate electric signals in accordance with the intensity of the received light beams. The electrical signals are transmitted to a microprocessor 76 (FIG. 10) located in the electronics box 34 (FIG. 1) for processing in a manner that will be described more fully hereinafter.

Figure 5:
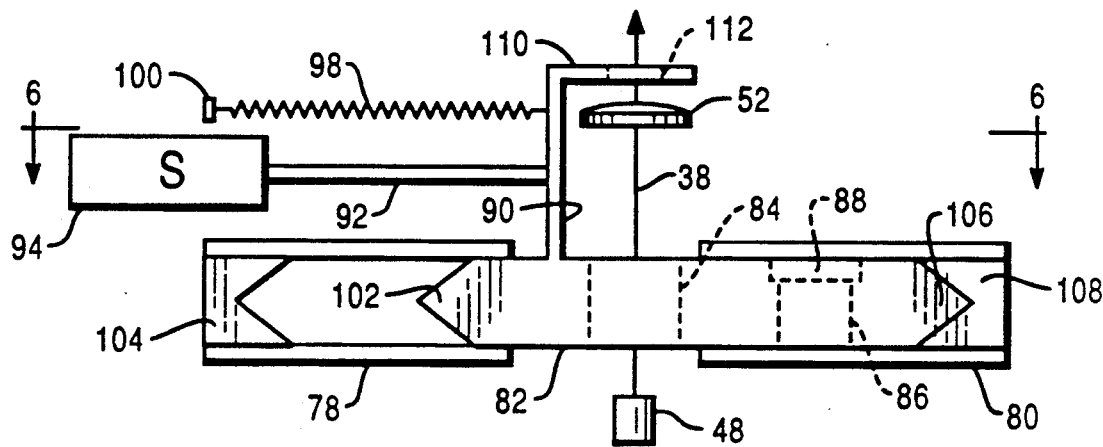
FIG. 5 is a view similar to that of FIG. 4 but with the slide member in an actuated position in which the light beam is projected through the open aperture in the slide member and a small aperture in the arm extension.
Figure 6:
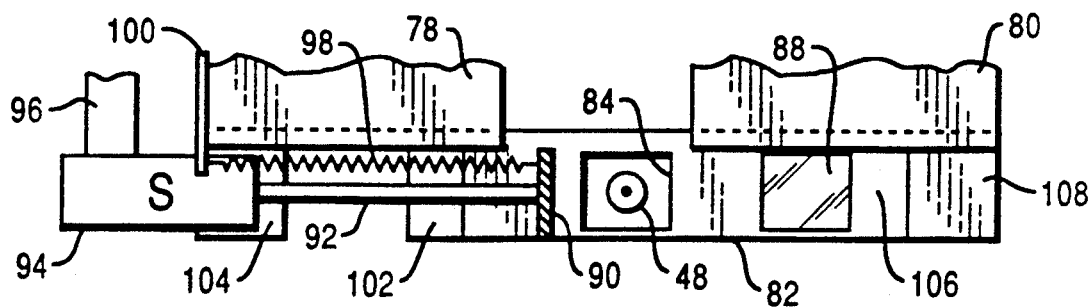
FIG. 6 is a side sectional view of the slide member, taken on lines 6—6 of FIG. 5, showing a portion of the two rail support members for slidably mounting the slide member in the beam axis of the laser source.

As shown in FIG. 2, slidably mounted on a pair of rail members 78 and 80 which are secured to the floor member 50 of the head portion 24 is a slide member 82 (FIGS. 2, and 4-6 inclusive) which includes a pair of apertures 84 and 86 extending through the slide member 82. Mounted at one end of the aperture 86 is a glass member 88 which covers one end of the aperture. Extending outwardly from one side of the slide member 82 is an arm portion 90 to which is rigidly secured one end of an armature 92. The armature is slidably mounted within a solenoid 94 mounted on a support member 96 (FIG. 6) secured to the floor member 50. Secured to the arm portion 90 is a spring member 98 having one end secured to an abutment member 100. The spring member 98 will normally bias the arm member in a direction towards the solenoid 94 which moves the end portion 102 of the slide member 82 into a stop portion 104 of the rail member 78. Energizing of the solenoid 94 will move the slide member 82 from the position shown in FIG. 4 to the position shown in FIG. 5 through the movement of the armature 92 where the end portion 106 of the slide member will engage a stop portion 108 of the rail member 80. The arm portion 90 has a right angle extension portion 110 which includes a small aperture 112 which is moved to a position adjacent the collimator lens member 52 upon the energizing of the solenoid 94. As will be described more fully hereinafter, movement of the slide member 82 from the position shown in FIG. 4, where the glass member 88 is positioned to intercept the laser beam 38 to the position shown in FIG. 5, where the apertures 84 and 112 are positioned adjacent the lens member 52, will move the focus of the lens member 52 closer to the scanning head portion 28. The aperture 112 is used in focusing the scanning light beam when the focus of the lens member 52 is moved closer to the scanning head portion 28.

Figure 10:
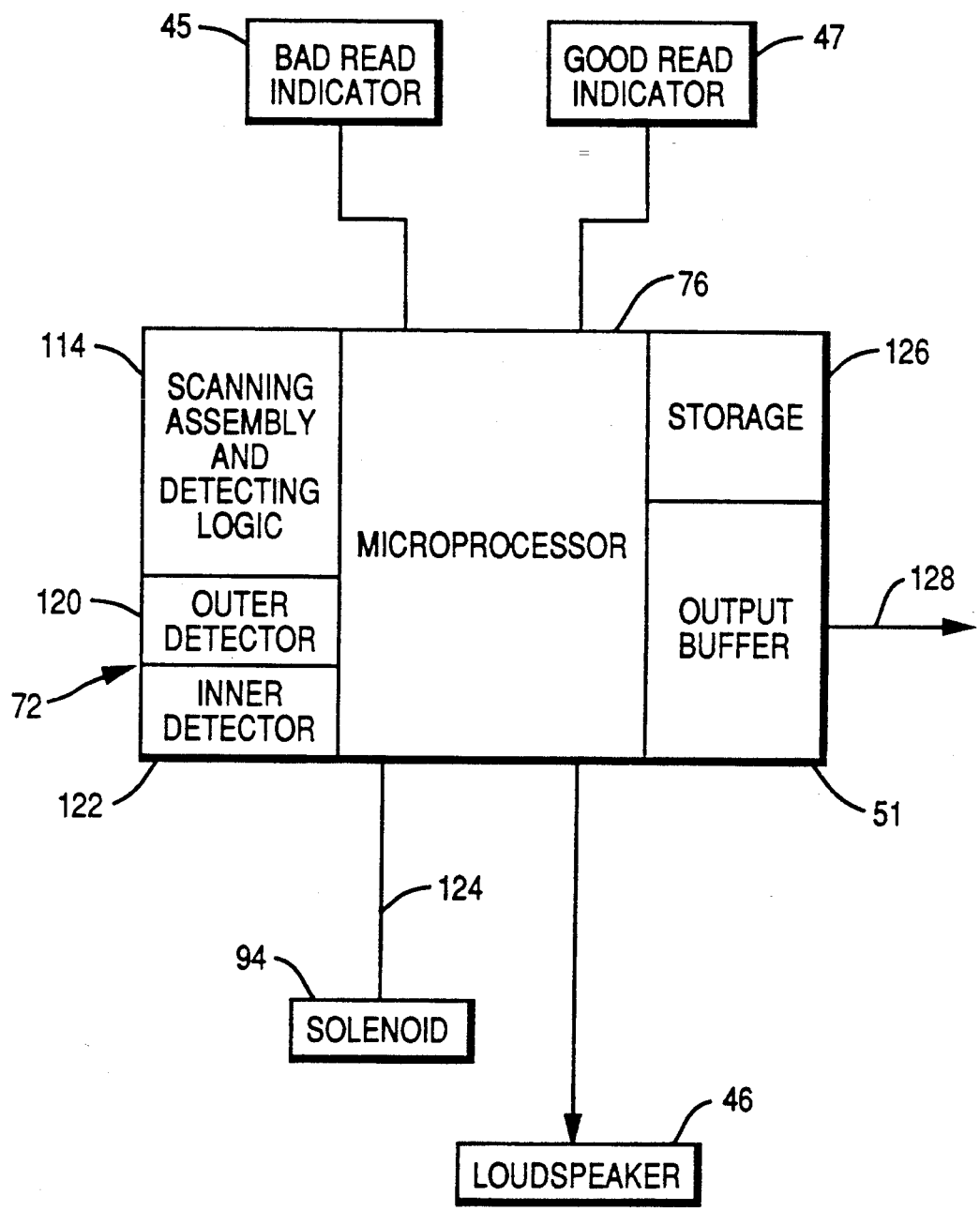
FIG. 10 is a block diagram of the checkout system of the present invention.

Referring now to FIG. 10, there is shown a block diagram of the data processing system employed in the present invention. Included in the data processing system is a scanning assembly and detection logic unit 114 which includes the bar code scanning device 18 (FIG. 1) for converting scanned bar codes into electrical signals. Further included in the processing system is the microprocessor 76 for checking and decoding the signals read by the detecting logic unit 114 and for generating control signals to the bad read indicator 45, the good read indicator 47 and the loudspeaker 46, to indicate the validity of a scanning operation by the scanning device 18 in the manner previously described. The microprocessor 76 also receives signals from the detector 72 (FIG. 11) for controlling the operation of the solenoid 94. The detector 72 includes an outer detector portion 120 and an inner detector portion 122 which senses the position of the bar code label with respect to the scanning head portion 28 in a manner to be described more fully hereinafter in addition to generating electrical signals representing the data read by the scanning operation. In response to the signals received from the detector portions 120 and 122, the microprocessor will send energizing signals to the solenoid 94 over line 124. Also included in the data processing system are a conventional storage unit 126 and an output buffer 51 for transmitting the data signals read by the detecting logic 114 over line 128 to a remote processor for obtaining the price of the item associated with the coded label read in a manner that is well known in the art.

Figure 7:
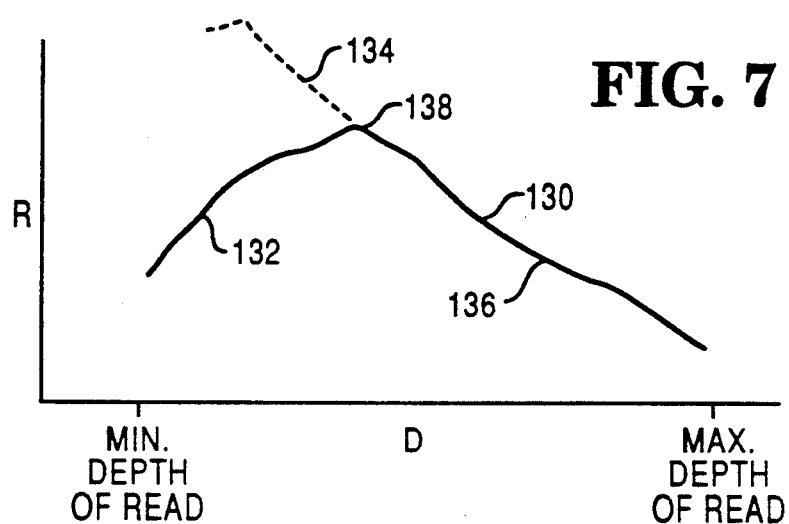
FIG. 7 is a graph showing the strength of the output signal of the detector as the scanned bar code label is moved in a vertical direction with respect to the scanning head of the bar code scanner.
Figure 8:
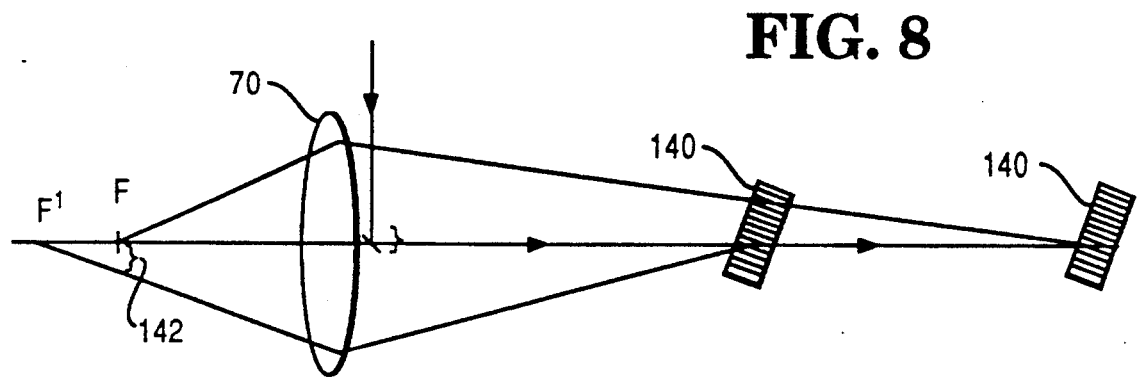
FIG. 8 is a diagrammatic illustration of the bar code scanning system showing the overfilling of the detector as the scanned bar code label is moved closer to the collection lens system.

In the operation of the system, positioning of a bar code label adjacent the scanning head portion 28 (FIG. 1) results in the scanning light beams 38 scanning the label. The reflected light beams from the label will be redirected back through the mirror assembly 60 (FIG. 2) and the spinner member 56 to the collection lens 70 from where the reflected light is focused on the detector 72. The intensity of the light that is focused on the detector 72 is a function of the distance between the bar code label and the scanning head portion 28 (FIG. 1). As shown in FIG. 7, the electrical response (R) of the detector 72 to the positioning of the bar code label 140 (FIG. 8) is shown by curve 130 in which the portion 132 of the curve decreases as the bar code label is moved closer to the scanning head portion 28 because of the overfilling of the inner detector portion 122 (FIG. 11) of the detector 72 by the reflected light collected by the collection lens 70 (FIG. 1). This overfilling condition is detected by the outer detector portion 120 of the detector 72 (FIG. 11) and is illustrated by the numeral 142 in FIG. 8 in which the focal point F of the collection lens 70 at which position the detector 72 is normally located moves to point $F^1$. The portion 134 (FIG. 7) of the curve 130 illustrates the response of the detector where no overfilling occurs.

As the label 140 moves away from the scanning head portion 28, the response of the detector 72 as represented by the portion 136 of the curve 130 decreases as the maximum depth of read is approached, which action underfills the inner detector portion 122. The depth of read is a function of the system focal point which is optimized in the present embodiment to scan 0.0075 in. bar widths, resulting in a five inch depth of read. To adjust the focal point of the focusing lens 52 (FIGS. 2, 4, 5 and 9) to the location of the bar code label 140, the inner detector portion 120 (FIG. 11) of the detector 72 will generate a response along the portion 136 (FIG. 7) of the curve 130 while the outer portion 122 of the detector 72 will help in generating the peak portion 138 of the curve by detecting an overfill condition.

Figure 9:
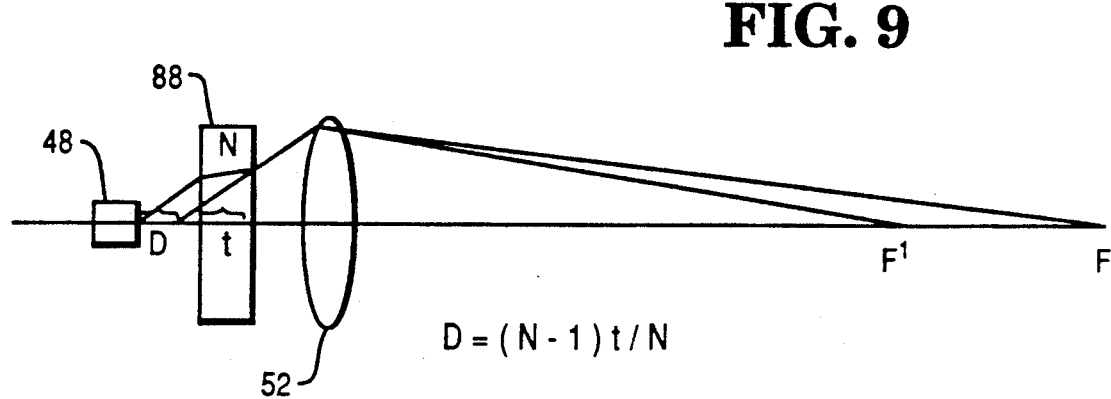
FIG. 9 is a diagrammatic illustration showing the shift of the focal point upon the insertion of the glass member in the slide member into the beam axis of the laser source.

As illustrated in FIG. 9, the focal point F of the focusing lens 52 is normally dependent on the distance between the light source 48 and the lens 52. By inserting a glass member 88 between the light source 48 and the lens 52, the focal point can be moved between F and $F^1$. As a bar code label 140 (FIG. 8) is moved closer to the scanning head portion 28 (FIG. 2), the collected light will start to overfill the detector 72 with the outer detector portion 120 outputting electrical signals to the microprocessor 76 (FIG. 10) resulting in the energizing of the solenoid 94 (FIGS. 2, and 4-6 inclusive). Energizing of the solenoid 94 enables the armature 92 to move the slide member 82 to the position shown in FIG. 5 where the glass member 88 is removed from the path of the scanning light beam 38 and the aperture 112 is positioned adjacent the focusing lens 52 enabling the lens 52 to focus the light beams 38 at the focal point $F^1$ (FIG. 9). The system number F is an arbitrary number which is the ratio of the depth of focus of the lens 52 to the aperture of the lens which must remain constant when the focus of the lens is shifted from $F^1$ and F. In order to achieve this condition, the aperture 112 is used when the lens 52 focuses the light beams at $F^1$. The default aperture is the width of the lens 52.

Figure 4:
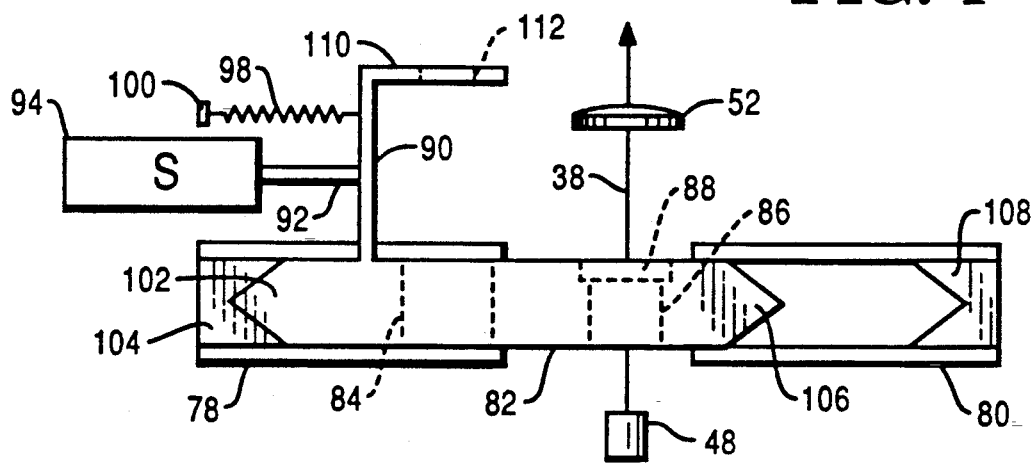
FIG. 4 is an enlarged detailed top view of the slide member when in a home or default position showing the location of the laser source and the beam axis of the scanning light beams when projected through the aperture in the slide member containing the glass member for increasing the depth of the focal point of the light beam.

As the bar code label 140 is moved away from the scanning head portion 28, the electrical signals outputted by the outer detector portion 120 will enable the microprocessor 116 to de-energize the solenoid 94 resulting in the spring member 98 returning the slide member 82 to the position shown in FIG. 4 where the glass member 88 is positioned in the path of the light beam 38. The glass member 88 will shift the focal point of the lens 52 to the furthest focal point F (FIG. 9). The insertion of the glass member 88 into the path of the light beam 38 between the laser diode 48 and the focusing lens 52 will cause an effective shift (D) of the focal point in accordance with the following equation (FIG. 9):

$D = (N-1)t/N$ where N is the index of refraction of the glass member 88 and t is the thickness of the glass member.

If $N = 1.48$ and $t = 0.62$ mm, then $D = 0.2$ mm. This will give an effective shift of 5 inches of the focal point. If the collection system had been optimized originally to have a depth of read of five inches, utilizing the present invention would increase the depth of read to ten inches. This arrangement is particularly advantageous to overhead and handheld optical scanners where the positioning of the merchandise item on which the bar code is located is controlled by the hand of the checkout operator.

Although the preferred embodiment of the present invention has been described herein, it is not intended that the invention be restricted thereto but that it be limited only by the true spirit and scope of the appended claims.

What is claimed is:

1. In an optical scanning apparatus for scanning coded indicia including a source of scanning light beams for projecting the light beams along a first path and focusing means positioned in the first path for focusing the light beams in a first focal plane through which the coded indicia is moved enabling the light beams to scan the coded indicia, means for adjusting the position of the first focal plane comprising;

collecting means for collecting a first amount of light reflected from the scanned coded indicia when in said first focal plane and focusing the reflected light at a location, said collecting means collecting a second amount of light reflected from the scanned coded indicia when the coded indicia is in a second focal plane which is closer to said focusing means than said first focal plane for directing the second amount of light to said location;

means mounted at said location for receiving said first and second amounts of light for generating a first control signal in response to receiving said first amount of light from said collecting means and a second control signal in response to receiving said second amount of light from said collecting means;

means mounted in said first path for enabling said focusing means to focus the light beams in said second focal plane when actuated; and actuating means operatively engaging said enabling means and coupled to said generating means for actuating said enabling means in response to the generating of said second control signal whereby said focusing means focuses the light beams in said second focal plane.

2. The optical scanning system of claim 1 in which said generating means comprises detector means mounted at said location for receiving said first and second amounts of light from said collecting means, said detector means generating said first and second control signals enabling said focusing means to focus said light beams in said first and second focal planes in accordance with the location of the coded indicia with respect to said focusing means.

3. The optical scanning system of claim 1 in which said enabling means includes a movable support member positioned in said first path and focus adjusting means mounted on said support member for enabling the focusing means to focus the light beams in said first focal plane when positioned in said first path and enabling the focusing means to focus the light beams in said second focal plane when not positioned in said first path.

4. The optical scanning system of claim 3 in which the focus adjusting means comprises a transparent substrate mounted on said support member and said actuating means comprises a drive member engaging said support member and operated by said second control signal for moving the support member to an actuated position in which the transparent substrate is moved out of said first path.

5. The optical scanning system of claim 4 which further includes a resilient actuating member engaging said support member for normally moving said support member to a home position in which the transparent substrate is in said first path.

6. The optical scanning system of claim 5 in which said transparent substrate comprises a glass window.

7. The optical scanning system of claim 2 in which said detector means includes a first detector portion for generating said first control signal in response to receiving said first amount of light and a second detector portion for generating said second control signal in response to receiving said second amount of light;

8. The optical scanning system of claim 2 in which said first amount of light is less than said second amount of light.

9. The optical scanning system of claim 7 in which said detector includes a face portion for receiving the focused light from said collecting means, said first detector portion comprises an inner portion of the face portion and said second detector portion comprises an outer portion of the face portion.

10. In an optical scanning apparatus for scanning coded indicia including a source of scanning light beams for projecting the light beams along a first path and focusing means positioned in the first path for focusing the light beams in a first focal plane through which the coded indicia is moved enabling the light beams to scan the coded indicia, means for adjusting the position of the first focal plane comprising;

means for collecting the light reflected from the scanned coded indicia and focusing the collected light at a location;

first detector means located at the first point for generating first electrical signals in response to the amount of collected light detected at said location;

a slidably mounted support member positioned between the source of scanning light beams and the focusing means;

a transparent substrate mounted on said support member and normally positioned in said first path when the support member is in a first position;

second detector means mounted at said location for generating second electrical signals in response to detecting the collected light from a scanned coded indicia which is positioned in a second focal plane closer to the focusing means than the first focal plane;

and actuating means engaging the support member and coupled to said second detector means for moving the support member to a second position which removes the transparent substrate from the first path enabling the focusing means to focus the light beams in said second focal plane in response to the generation of said second electrical signals.

11. The optical scanning system of claim 10 in which said actuating means comprises an electrically operated drive member engaging said support member and operated by said second electrical signals for moving said support member to said second position.

12. The optical scanning system of claim 10 which further includes a resilient actuating member engaging said support member for normally moving said support member to said first position in which the transparent substrate is in said first path.

13. The optical scanning system of claim 10 in which said support member includes an extension portion having an aperture which is positioned in said first path adjacent the focusing means when the support member is in said second position enabling the focusing means to focus the scanning light beams in said second focal plane.

14. The optical scanning system of claim 10 in which said transparent substrate comprises a glass window.

15. The optical scanning system of claim 10 which further includes a detector member having a light receiving face portion, said first detector means comprising an inner portion of the face portion and said second detector portion comprising an outer portion of the face portion.

* * * * *